(12) United States Patent
Duncan et al.

(10) Patent No.: US 9,728,963 B2
(45) Date of Patent: Aug. 8, 2017

(54) ELECTRICAL POWER SUPPLY SYSTEM

(71) Applicant: True Power Electric, LLC, West Valley, UT (US)

(72) Inventors: Scott C. Duncan, West Jordan, UT (US); Collin S. Duncan, West Jordan, UT (US); Jacob B. Duncan, West Jordan, UT (US)

(73) Assignee: TRUE POWER ELECTRIC, LLC, West Valley, UT (US)

( * ) Notice: Subject to any disclaimer, the term of this patent is extended or adjusted under 35 U.S.C. 154(b) by 334 days.

(21) Appl. No.: 14/656,460

(22) Filed: Mar. 12, 2015

(65) Prior Publication Data

US 2016/0268886 A1    Sep. 15, 2016

(51) Int. Cl.
*H02J 3/01* (2006.01)

(52) U.S. Cl.
CPC ............... *H02J 3/01* (2013.01); *Y02B 70/126* (2013.01)

(58) Field of Classification Search
CPC ........................................................ H02J 3/01
See application file for complete search history.

(56) References Cited

U.S. PATENT DOCUMENTS 5,844,791 A * 12/1998 Swamy ............... H02J 3/01
333/175
9,484,833 B2 * 11/2016 Zhou ................... H02M 7/797

* cited by examiner

*Primary Examiner* — Jeffrey Zweizig
(74) *Attorney, Agent, or Firm* — Keller Jolley Preece (57) ABSTRACT

The principles described herein provide an electrical power supply system having circuitry that reduces the noise and interference of harmonic signals introduced by non-linear loads. In particular, one or more embodiments can include a power correction system that includes transformers and capacitors having parameters and configured to redirect harmonic energy in a power signal to deliver clean power to loads in a system. Additionally, the power correction system can mitigate negative effect of in-rush current passing through the electrical power supply system resulting in more efficient energy usage and reducing power failure of loads in the system. Moreover, the power correction system can include various additional features that facilitate convenient connection and/or disconnection of the power control system without disrupting the delivery of electrical power to loads in the system.

20 Claims, 7 Drawing Sheets

ELECTRICAL POWER SUPPLY SYSTEM

BACKGROUND

1. Technical Field

One or more embodiments of the present disclosure generally relate to systems and devices for improving power efficiency. More specifically, one or more embodiments of the present disclosure relate to improving power efficiency of an electronic power supply system.

2. Background and Relevant Art

Conventional power systems often distribute power to multiple loads on a system. In particular, conventional power systems typically distribute power among multiple types of loads having different power requirements and specifications. Additionally, many power systems include non-linear loads that switch on and off drawing a non-linear supply of power from a power source. Thus, with an increasing number of loads (linear and non-linear) in power systems, there is an increasing demand for effective distribution of power in electrical power systems.

Conventional power systems, however, suffer from a number of limitations and drawbacks. For example, the use of multiple loads (e.g., non-linear loads) often introduces harmonic signals into power systems. In particular, non-linear loads that switch on and off often introduce one or more harmonic signals of varying amplitudes and phase angles to the power system. These harmonic signals may interfere with a power signal by distorting a voltage, opposing the wave of the power signal, and otherwise producing noise. The harmonic signal can further decrease the power efficiency of a system and negatively affect various power metrics, often resulting in higher power bills and decreased operation life of electronic loads.

Additionally, using multiple non-linear loads often introduces in-rush current to the power system. In particular, as one or more loads switch on and off, the loads can draw instantaneous surges of current in and out of different components of the power system resulting in current spikes and affecting the power consumption of devices within the power system. For example, many loads have high current usage when switched on that spikes or peaks upon switching on the load and leveling out after a period of time has passed. Additionally, many loads switch on and off multiple times throughout routine operation causing multiple spikes of current over time. These non-linear loads often result in irregular current levels passing through the system at different points in time. Further, this current irregularity often results in higher power consumption, equipment failure, burned out capacitors, and other problems.

In addressing some of these problems, many conventional power systems have implemented high efficiency loads designed to consume less power. Notwithstanding, while improving loads on an individual basis may improve overall power consumption, the number of loads being driven within power systems is generally increasing. In particular, using more and more non-linear loads often has an additive effect to the harmonics and in-rush current within a system. Thus, even using more efficient loads, conventional power systems generally fail to effectively address problems introduced by harmonic signals and in-rush current.

Accordingly, there are a number of considerations to be made in improving power efficiency of an electronic power supply system

BRIEF SUMMARY

The principles described herein provide benefits and/or solve one or more of the foregoing or other problems in the art. For example, an electrical power supply system (or simply "system") can include circuitry that reduces the noise and interference of harmonic signals introduced by non-linear loads. In particular, one or more embodiments can include a power correction circuit that includes circuitry designed to redirect harmonic energy and provide a constant flow of current to non-linear devices within the power delivery system. In particular, the power correction circuit can be coupled to the electrical power supply system at a point of common coupling and reduce many of the negative effects of conventional power systems as electrical power is distributed to one or more loads on the system.

In addition to reducing negative effects of harmonic signals, the power correction circuit can mitigate negative effects of in-rush current passing through the power delivery system. In particular, the power correction circuit can include features to feed back in-rush currents from harmonic signals into the power signal. Further, the power correction circuit can include a transformer and capacitors that feedback the in-rush current at the same cycle as the power signal, thus preventing in-rush current from further feeding the harmonic signal. In one or more additional embodiments, the power correction circuit can couple in parallel to the path of a power signal through the system. In particular, the power correction circuit can couple in parallel to the path of the power signal through the system without interrupting normal operation of components within the system. In this way, the power correction circuit can be connection and/or disconnected for installation, removal, modification, or other maintenance without inconveniencing those people who are using one or more loads supported by the power delivery system.

Additional features and advantages of exemplary embodiments will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other advantages and features of the embodiments can be obtained, a more particular description of the principles briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of its scope, principles will be described and explained with additional specificity and detail through the use of the accompanying drawings.

DETAILED DESCRIPTION

One or more embodiments described herein include an electrical power supply system (or simply "system") having a power correction system that provides power correction of a power signal being distributed to one or more loads powered by the system. In particular, a power correction system can be electrically coupled to a power source at a point of common coupling. In some embodiments, the power correction system can include a transformer circuit and a capacitor circuit coupled in series behind the transformer circuit from the point of common coupling. Further, electrically coupling the can facilitate electrical power (e.g., a power signal) having a first set of characteristics prior to the point of common coupling and a second set of characteristics after the point of common coupling. Additionally, in some embodiments, the power correction system can be electrically coupled to the point of common coupling by way of a main breaker configured to electrically connect and/or disconnect the power correction system from the electrical power supply system.

Using the principles described above, one or more embodiments of the system can facilitate a system having improved power efficiency. For example, the transformer circuit coupled to the point of common coupling can facilitate redirection of harmonic energy into a power signal. In particular, the combination of the transformer circuit in series with the capacitor circuit can facilitate a phase shift of a power signal to align with one or more harmonic signals produced from one or more loads on the system.

Additionally, the system can include one or more features to decrease negative effects of in-rush current present in the system. In particular, the capacitor circuit in series behind the transformer circuit can mitigate inrush current caused when electrical energy is applied to the transformer circuit. Additionally, the capacitor circuit in combination with the transformer circuit can facilitate an interaction between components of the power correction system that produces a magnetic field that reduces inrush current introduced by one or more loads powered by the system in addition to reducing inrush current introduced by the transformer circuit.

In addition to reducing inefficiencies due to harmonic energy and inrush current, the system can include a power correction system connected to the system at the point of common coupling in a parallel configuration. Connecting the power correction system in a parallel configuration can facilitate improvement in power efficiency and other benefits without interrupting operation of one or more loads powered by the system. In particular, the power correction system can include features to facilitate connection and/or disconnection of one or more components of the power correction system without requiring interruption of a power signal from a power source to one or more loads electrically coupled to the system.

As used herein, a "point of common coupling" may refer to any point in a power system between a power source and one or more loads receiving power by the power source. In particular, a point of common coupling can refer to a node or other interface between a power source and one or more loads powered by the power source. For example, a point of common coupling can refer to an output of a meter system. In particular, a point of common coupling can refer to a node between an output of a power meter and a switch board or other power distributor.

Figure 1:
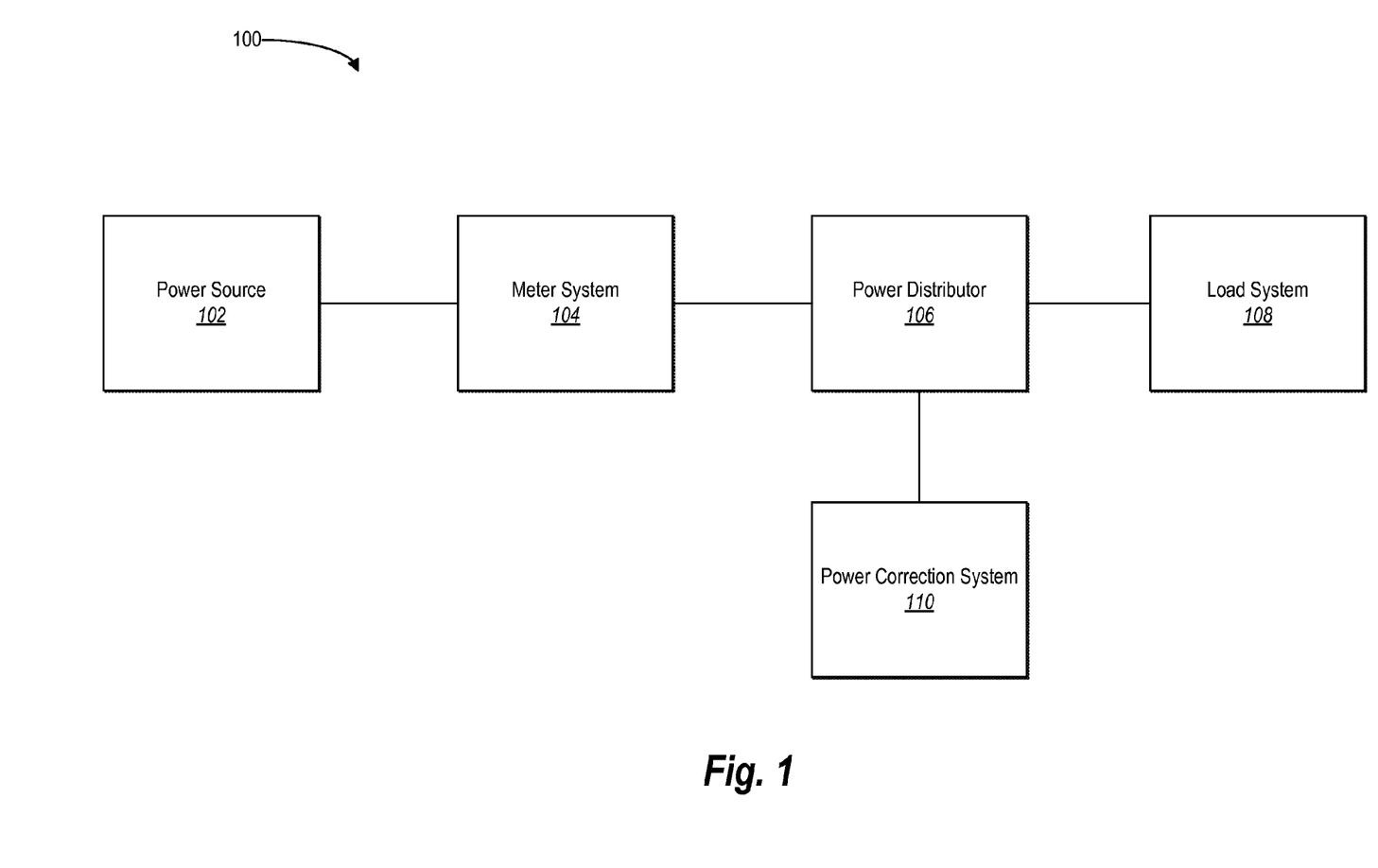
FIG. 1 illustrates a block diagram of an electrical power supply system in accordance with one or more embodiments described herein.

Exemplary systems and devices will now be described in reference to the drawings. For example, FIG. 1 illustrates an example of an electronic power supply system 100 (or simply "system") in accordance with one or more principles described herein. In particular, FIG. 1 illustrates a block diagram of a system 100 including a power source 102, meter system 104, power distributor 106, load system 108, and a power correction system 110 coupled to the power source 102 at a point of common coupling.

Power can be provided to the system 100 by way of a power source 102. In particular, the power source 102 can include one or more electrical power generators and power transmission lines for providing electrical power to components of the system 100. In some embodiments, the power source 102 includes one or more power generating sources that supply power to a single system 100. Alternatively, the power source 102 can include a power generator generating and supplying electrical power from a single source.

The power source 102 can provide power to the system 100 using one or more types of electrical power. For example, the power source 102 can provide electrical power in the form of coal power, gas power, solar power, wind power, hydraulic power, nuclear power, or a combination of multiple types of power. In some embodiments, the power source 102 can provide each of the types of electrical power to the system 100 by way of a single transmission line. Alternatively, the power source 102 can provide each of the types of electrical power to the system 100 by way of multiple transmission lines.

As mentioned above, the power source 102 can provide electrical power to the system 100 by way of a meter system 104. In particular, the meter system 104 can include one or more devices for measuring power consumed by a load system 108 in the system 100. For example, a meter system 104 can include a power meter that measures the amount of electrical energy consumed by a residence, business, or one or more electrically powered devices. In some embodiments, the meter system 104 can include a single power meter connected to all loads within a load system 108. Alternatively, the meter system 104 can include multiple power meters measuring energy consumption of multiple load systems 108.

The meter system 104 can measure various power metrics of a system 100. In particular, the meter system 104 can measure one or more billable units. In some embodiments, the meter system 104 measures energy consumption in kilowatt hours (kWh). Additionally, the meter system 104 can measure billable units at different periods of a day, week, month, or year. Thus, in addition to measuring cumulative energy consumption of a load system 108, the meter system 104 can measure energy consumption at peak periods, off-peak periods, or other desired billable metrics.

The meter system 104 can receive electrical power having a first set of characteristics from the power source 102 at an input to the meter system 104. In some embodiments, the electrical power received at the input of the meter system 104 can include a similar set of characteristics as other meters and systems receiving electrical power from a common power source 102. For example, the electrical power received at the input of the meter system 104 can include a power signal having a particular voltage, frequency, current, and/or other characteristic as electrical power provided to other systems. Alternatively, the electrical power received at the input of the meter system 104 can have a different set of characteristics as other systems received power from the power source 102.

In some embodiments, the input of the meter system 104 is coupled directly to the power source 102. In particular, in some embodiments, the meter system 104 can provide an accurate measurement of energy consumption at an output of the meter system 104 provided there is no interruption of a power signal provided by the power source at the input of the meter system 104. For example, the meter input can include a single transmission line with no interrupting connections between the power source 102 and the meter system 104.

As illustrated in FIG. 1, the meter system 104 can connect in series between the power source 102 and a power distributor 106. The power distributor 106 can provide power to a load system 108. In particular, the power distributor can direct electrical energy provided from the power source 102 to one or more power consuming loads in the load system 108. In some embodiments, the power distributor 106 can power each of the loads in the load system 108 using electrical power provided by the power source 102. Alternatively, the power distributor 106 can block or interrupt a power signal from the load system 108.

In some embodiments the power distributor 106 can include a switchboard or distribution board. For example, the power distributor 106 can include one or more switches to direct and/or prevent a power signal from being supplied to loads on the system 100. For example, in the system 100 illustrated in FIG. 1, the power distributor 106 can include one or more switches corresponding to a particular load system 108. In particular, the power distributor 106 can provide a power signal having particular power characteristics (e.g., current, voltage, frequency) to one or more loads on the load system 108.

As mentioned above, the system 100 can include a load system 108. The load system 108 can include one or more loads powered by the power source 102. In particular, the load system 108 can receive a power signal by way of the power distributor 106 having one or more power characteristics particular to one or more loads in the power system 108. In some embodiments, a load system 108 can include one or more loads having similar power characteristic requirements. Alternatively, the load system 108 can include one or more loads with different power requirements.

The system 100 can further include a power correction system 110 coupled to the power source 102 at a point of common coupling. In particular, the power correction system 110 can be coupled to a point between the meter system 104 and a load system 108. For example, as illustrated in FIG. 1, the power correction system 110 can be coupled to the output of the meter system 104.

The power correction system 110 can have a parallel configuration with the system 100. For example, as illustrated in FIG. 1, the power correction system 110 can couple in parallel to a point of common coupling. In particular, the power correction system 110 can electrically couple to the point of common coupling without interrupting a flow of a power supply signal provided by the power source 102 and powering one or more loads on the load system 108. For example, the power correction system 110 can couple to the output of the meter system 104 without disconnecting the load system 108 from the system 100 or otherwise discontinuing a supply of electrical power from the power source 102 to the load system 108. Thus, the power correction system 110 can be installed within the system 100 while maintaining operation of one or more loads of the load system 108. Alternatively, one or more loads can be disconnected when coupling the power correction system 110 to the point of common coupling.

The power correction system 110 can facilitate a power supply signal having a set of power characteristics after the point of common coupling as the power supply signal provided by the power source 102 before arriving at the point of common coupling. In particular, the power correction system 110 can facilitate a power signal having a set of power characteristics at the point of common coupling that improves the power consumption of the load system 108. Examples of power characteristics that the power correction system 110 can affect include phase angle, current inrush, power factor, or other characteristic that may affect the power consumption within the system 100.

For example, the power correction system 110 can facilitate a phase shift of a power signal to align with one or more harmonic signals to provide a power signal to the load system 108 without harmonic distortion. The power signal without harmonic distortion can result in more efficient consumption of energy by the load system 108 and ultimately lead to a lower measurement of energy consumption at the power meter 104. In some embodiments, the power correction system 110 can cause a phase shift of the power signal to specifically align with a particular harmonic or set of harmonics. In one example, the power correction system 110 can facilitate a phase shift of the power signal to align with the third harmonic, fifth harmonic, seventh harmonic, or some combination of the third, fifth, and seventh harmonics. Alternatively, the power correction system 110 can facilitate a phase shift of the power signal to align with any harmonic that may oppose the sine way of the power signal from the power source 102.

The power correction system 110 can further facilitate a power supply signal having less inrush current as a result of non-linear loads within the load system 108. For example, where one or more loads of the load system 108 switch on and off during operation and cause feedback spikes of current throughout the system 100, the power correction circuit 110 can reduce the magnitude of inrush current spikes caused by the loads in the load system. Consequently, the reduction of inrush current can facilitate more efficient energy consumption of one or more loads in the load system 108. Additionally, reduced inrush current can facilitate fewer instances of equipment failure for one or more devices in the load system 108.

In some embodiments, the power correction system 110 can increase a power factor of the system 100. In particular, by aligning the power signal and harmonic energy in addition to reducing inrush current, the power correction system 110 can facilitate a higher ratio of real power flowing to the load system 108 to the apparent power in the system 100. Thus, the power correction system 110 can facilitate more efficient power usage of the load system 108 by feeding harmonic energy back into the power signal in addition to reducing the inrush current caused one or more loads in the load system 108.

Figure 2:
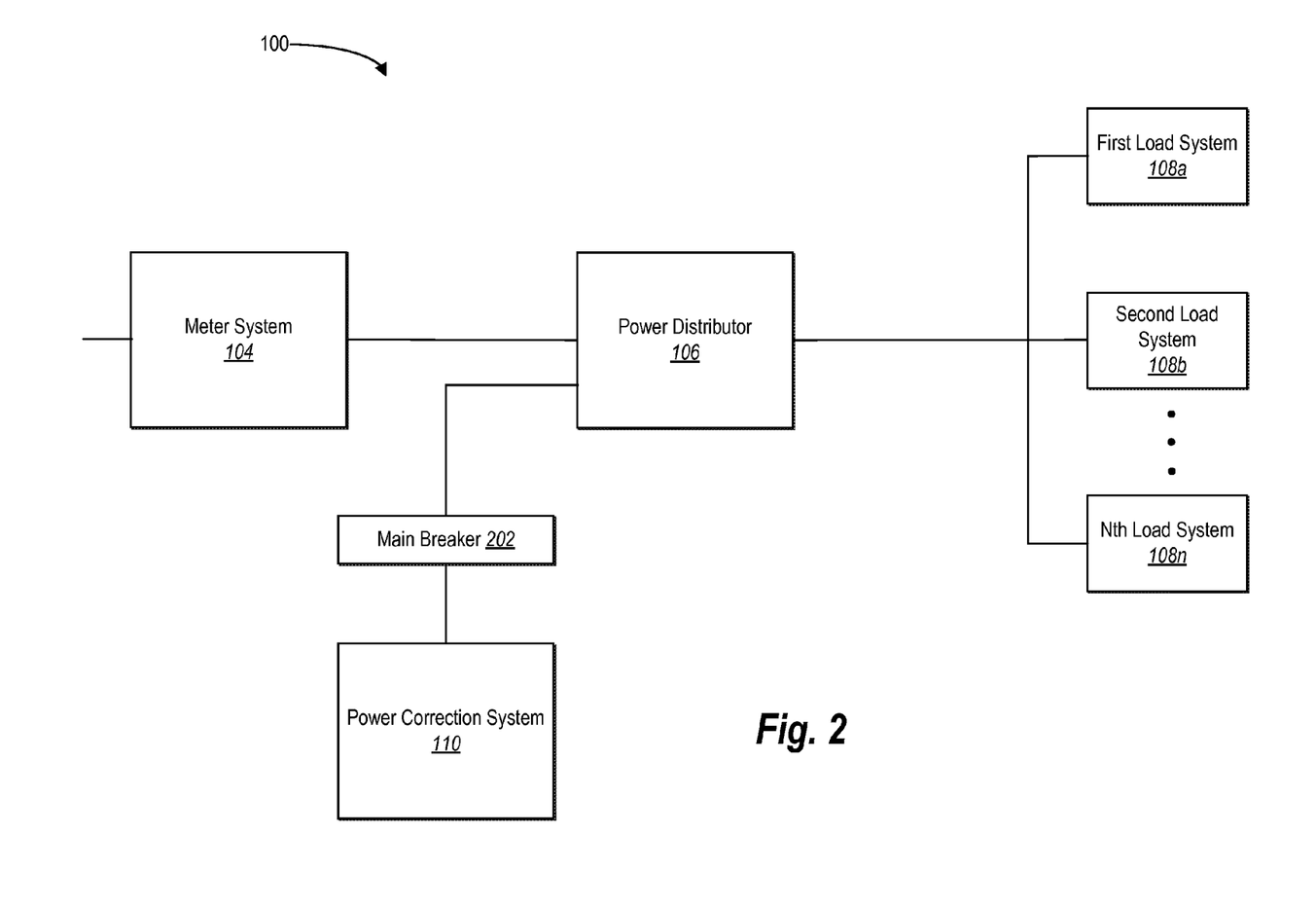
FIG. 2 illustrates a block diagram of an electrical power supply system in accordance with one or more embodiments described herein.

FIG. 2 illustrates an example of an electronic power supply system 100 (or simply "system") in accordance with one or more principles described herein. In particular, the system 100 of FIG. 2 may illustrate a more detailed embodiment of the system 100 described above in connection with FIG. 1.

For example, as illustrated in FIG. 2, the system 100 can include a meter system 104, power distributor 106, and power correction system 110. While not shown in FIG. 2, the system 100 can further include a power source 102 providing electrical power to one or more load systems 108 by way of the meter system 104 and the power distributor 106. It is noted that the meter system 104, power distributor 106 and power correction system 110 can include similar features and functionality as similar components described above in connection with FIG. 1.

As illustrated in FIG. 2 the meter system 104 can couple to the load systems 108 by way of a point of common coupling. Additionally, as shown in FIG. 2, the point of common coupling can include multiple inputs from the power source having different characteristics. In particular, the power source 102 can provide multiple inputs having different phases. For example, as illustrated in FIG. 2, the power supply 102 can provide three inputs corresponding to three different phases.

Each of the point of common coupling inputs can include a phase corresponding to a transformer from the power source 102. In particular, the point of common coupling can include a first phase distribution input having a first phase corresponding to a first transformer on the power source 102. The point of common coupling can further include a second phase distribution input having a second phase corresponding to a second transformer on the power source 102. The point of common coupling can further include a third phase distribution input having a third phase corresponding to a third transformer on the power source. Other embodiments can include additional or fewer phase distribution inputs having different phases.

The power correction system 110 can electrically couple to the point of common coupling by way of each of the phase distribution inputs. In particular, the power correction system 110 can electrically couple to the point of common coupling at each of the phase distribution inputs in a parallel configuration. For example, as illustrated in FIG. 2, the power correction system 110 can couple to the first phase distribution input using a first conductor. Additionally, the power correction system 110 can couple to the second phase distribution input using a second conductor. Further, the power correction system 110 can couple to the third distribution input using a third conductor. Moreover, as illustrated in FIG. 2, the power correction system 110 can electrically couple to each of the phase distribution inputs in a parallel configuration without interrupting one or more power signals provided to the load systems 108.

In addition to electrically coupling to each phase distribution input, the power correction system 110 can couple to the point of common coupling by way of a main breaker 202. In particular, the main breaker 202 can provide an on/off switch for connecting and/or disconnecting the power correction system 110 from the point of common coupling. In some embodiments, the main breaker 202 can include a single switch to disconnect the power correction system 110 from all of the phase distribution inputs. Alternatively, the main breaker 202 can include individual switches to selectively connect and/or disconnect the power correction system 110 from each of the phase distribution inputs.

As mentioned above, the system 100 can include one or more load systems 108. In particular, as illustrated in FIG. 2, the system 100 can include multiple load systems 108a-108n. For example, the system 100 can include a first load system 108a, second load system 108b and any number of load systems 108 up to an Nth load system 108n. Alternatively, the system 100 can include a single load system 108.

Each load system 108 can include one or more loads within each load system 108. Additionally, each load within a load system 108 can receive electrical power from the power source 102. In some embodiments, every load system 108 is powered by the same power source 102. Alternatively, one or more load systems 108 can be powered from different power sources or from different power generating devices within the same power source 102.

In some embodiments, each load system 108 can operate using electrical energy having different properties as electrical energy provided to other load systems. In particular, each load system 108 can receive a power signal having different characteristics from power signals received at other load systems 108. For example, each load system 108 can include one or more loads that operate at a different frequency, voltage, or other characteristic as one or more loads of other systems. In some embodiments, each load system 108 can include one or more loads configured to receive a power signal having a particular characteristic that is different from one or more loads of other load systems 108. Alternatively, different load systems 108 can include one or more loads configured to receive power signals having similar characteristics.

In one example of load systems 108 having different requirements, a first load system 108a can receive a power signal having a first frequency based on a specification of one or more loads of the first load system 108a. Further, a second load system 108b can receive power signal having a second frequency based on a specification of one or more loads of the second load system 108b. Additionally, each load system 108 can include one or more loads having different frequency requirements from other load systems 108. Alternatively, each load system 108 can have one or more loads having similar frequency requirements from other load systems 108.

In some embodiments, the load systems 108 can be grouped according to particular power requirements or power characteristics of one or more loads of each load system 108. Additionally, load systems 108 can be grouped according to a combination of power requirements or power characteristics of one or more loads of each load system 108. Other criteria, such as physical location within a system 100, non-linear v. linear devices, or other criteria may determine a grouping of load systems 108 within the system 100.

As illustrated in FIG. 2, the system 100 can include a power distributor 106 coupled between the meter system 104 and the load systems. In providing electrical power to each of the load systems 108, the power distributor 106 can direct one or more power signals to each of the load systems 108. For example, the power distributor 106 can provide a first power signal to the first load system 108a and a second power signal to the second load system 108b. In some embodiments, the power distributor 106 can provide different power signals to each load system 108a-108n. Alternatively, the power distributor 106 can provide a single power signal to multiple load systems 108.

In directing power signals to the load systems 108, the power distributor 106 can direct power signals having particular characteristics to each load system 108. For example, as described above, each load system 108 can include one or more loads having different power requirements. Thus, the power distributor 106 can direct and/or interrupt signals to different load systems 108 according to characteristics of incoming power signals and/or specifications of one or more loads on each load system 108. In some embodiments, the power distributor 106 can direct power signals to one or more load systems 108 coupled to a particular switch in the power distributor 106.

Figure 3:
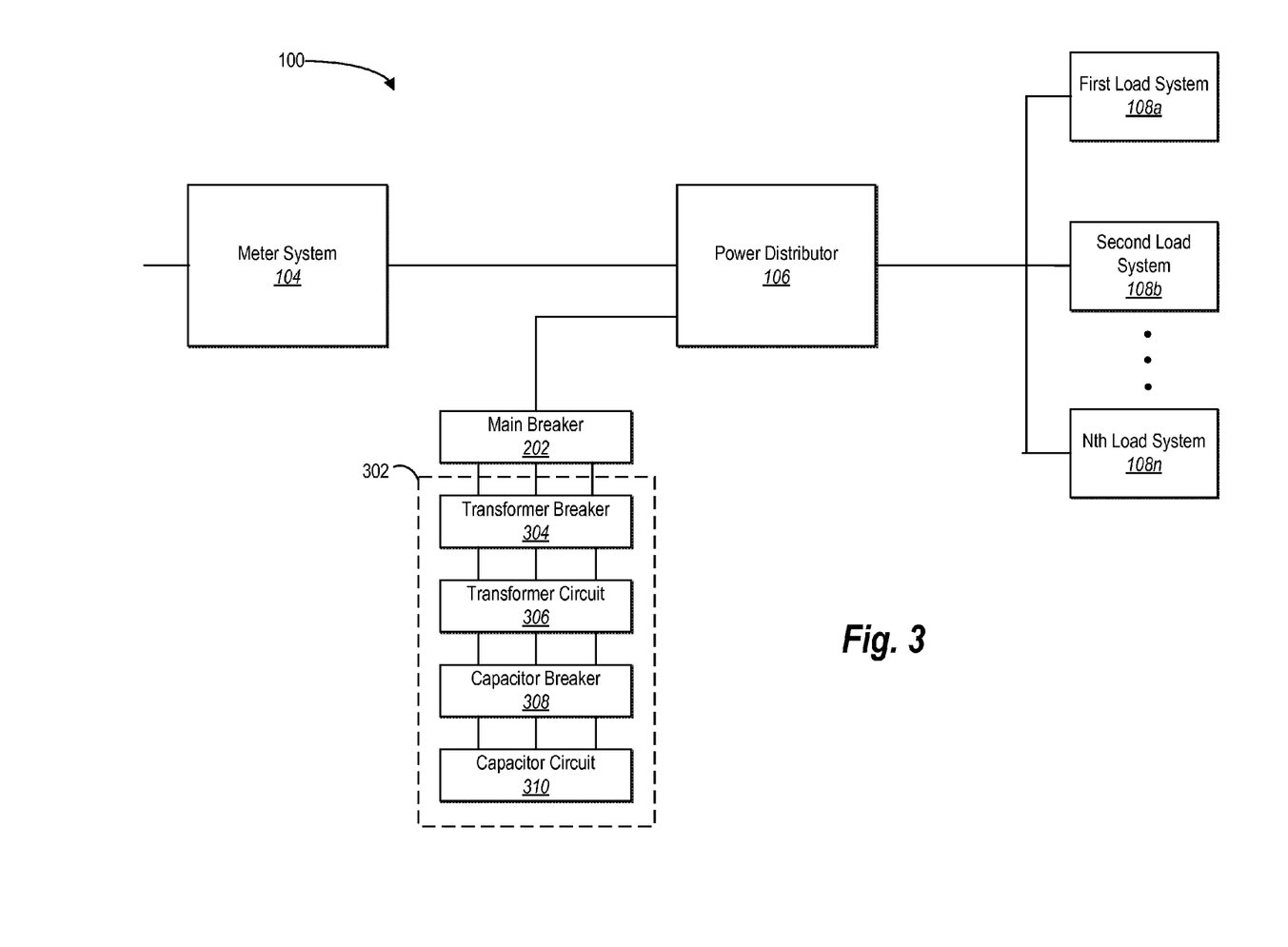
FIG. 3 illustrates a block diagram of an electrical power supply system in accordance with one or more embodiments described herein.

FIG. 3 illustrates an example of an electronic power supply system 100 (or simply "system") in accordance with one or more principles described herein. In particular, the system 100 of FIG. 3 may illustrate a more detailed embodiment of the systems 100 described above in connection with FIGS. 1 and 2.

For example, as illustrated in FIG. 3, the system 100 can include a meter system 104, power distributor 106, and load systems 108. Additionally, the system 100 can include a power correction system 110 coupled to a point of common coupling by way of a main breaker 202. While not shown in FIG. 3, the system 100 can further include a power source 102 providing electrical power to the load systems 108 by way of the meter system 104 and the power distributor 106. It is noted that the meter system 104, power distributor 106, and load systems 108 can include similar features and functionality as similar components described above in connection with FIGS. 1 and 2.

Additionally, FIG. 3 illustrates one example of a more detailed embodiment of the power correction system 110 described above in connection with FIGS. 1 and 2. In particular, the power correction system 110 can include a power correction circuit 302. In some embodiments, the power correction circuit 302 can include a transformer breaker 304, a transformer circuit 306, a capacitor breaker 308, and a capacitor circuit 310. In some embodiments, the power correction system 110 can include a single power correction circuit 302. Alternatively, the power correction system 110 can include multiple power correction circuits 302.

As mentioned above, the power correction circuit 302 can include a transformer breaker 304 and a transformer circuit 306. In particular, the transformer breaker 304 can couple in series with the transformer circuit 306 positioned behind the transformer breaker 304 from the point of common coupling. The transformer breaker 304 can connect and/or disconnect the transformer circuit 306 from the point of common coupling. In some embodiments, the transformer breaker 304 can connect and/or disconnect all components of the power correction circuit 302, including the transformer circuit 306, capacitor breaker 308, and capacitor circuit 310 from the point of common coupling.

The transformer circuit 306 can include a transformer coupled at the point of common coupling parallel to the meter system 104 and the load systems 108. Additionally, the transformer can be designed having particular parameters and a configuration to target a phase shift of a power signal. In particular, the transformer can have parameters and a configuration to target the third, fifth, seventh or a combination of one or more of the third, fifth, and seventh harmonic energy signals opposing a sine wave of the power signal provided by the power source 102. In some embodiments, the transformer can have a size and configuration to align one or more of the harmonics with a 60 Hz cycle of the power signal.

Further, the transformer circuit 306 can facilitate a phase shift of the power signal and/or the harmonic signals in the system 100. For example, the transformer circuit 306 can have a size and configuration designed to shift the phase of the power signal by an angle between 15 to 30 degrees. In some embodiments, the transformer circuit 306 can have a size and configuration to shift the phase of the power signal by a predetermined angle based on one or more angles of harmonic signals present in the power signal. Alternatively, the transformer circuit 306 can include a transformer having predetermined parameters (e.g., resistance, inductance, etc.) to facilitate a phase shift of the power signal by a predetermined angle.

Additionally, the power correction circuit 302 can include a capacitor breaker 308 and a capacitor circuit 310 coupled in series behind the transformer breaker 304 and transformer circuit 306. Similar to the transformer breaker 304, the capacitor breaker 308 can connect and/or disconnect the capacitor circuit 310 from the point of common coupling. In some embodiments, the capacitor breaker 308 can connect and/or disconnect a single capacitor circuit 310 in series with the transformer circuit 306. Alternatively, the capacitor breaker 308 can connect and/or disconnect multiple capacitor circuits 310.

Coupling the capacitor circuit 310 in series behind the transformer circuit 306 can facilitate an interaction between one or more capacitors in the capacitor circuit 310 and one or more transformers in the transformer circuit 306. In particular, the transformer circuit 306 can pass energy through a transformer and to one or more capacitors of the capacitor circuit 310. The capacitors can charge and discharge with the oscillation of the energy provided by way of the transformer circuit 306. In this way, the capacitor circuit 310 can receive and provide energy to the transformer circuit and facilitate a competing magnetic field having an effect on current passing through the system 100.

The transformer circuit 306 and capacitor circuit 310 coupled in series behind the transformer circuit 306 can mitigate negative effects of current spikes caused by the load systems 108. For example, the magnetic field caused by the transformer circuit 306 and capacitor circuit 310 can oppose or feed the power signal passing through the system 100 to reduce undesired inrush current spikes. In particular, the capacitor circuit 310 can include one or more capacitors that charge and discharge with the oscillation of the power signal at a rate that tempers the sudden changes in current that the inrush current introduces. In this way, instead of sudden spikes of current, the capacitor circuit 310 can facilitate inrush current having lower amplitude and spread out over a longer period of time. Thus, the current spikes can have a less dramatic effect on circuitry within the system 100 and facilitate more efficient energy consumption by the load systems 108.

Additionally, the transformer circuit 306 and capacitor circuit 310 coupled in series behind the transformer circuit 306 can facilitate a phase shift of the power signal. In particular, one or more transformers in the transformer circuit 306 and one or more capacitors in the capacitor circuit 310 can cause a phase shift of the power signal to align with harmonic signals introduced by loads in the load systems 108 that can oppose the sine wave of the power signal. In some embodiments, the transformer circuit 306 and capacitor circuit 310 can facilitate a phase shift of the power signal to align with the third, fifth, and/or seventh harmonic signals of the power signal such that the harmonic signals feed back into the 60 Hz cycle of the power signal rather than oppose the power signal. In some embodiments, the transformer circuit 306 and capacitor circuit can have particular parameters and a configuration to facilitate a particular angle of phase shift (e.g., 15-30 degrees).

In some embodiments, the transformer circuit 306 and capacitor circuit 310 can have a zig-zig configuration. In particular, the transformer circuit 306 can include a zig-zag transformer coupled to one or more capacitors of the capacitor circuit 310. For example, energy can pass through a first core of the transformer in a first direction. The energy can then pass through a second core of the transformer in a second direction. The energy can then pass through a third core of the transformer back in the first direction, zig-zagging through the transformer. In this way, capacitors from the capacitor circuit 310 can oppose the current as the energy from the zig-zag transformer passes in and out of the capacitor circuit 310, resulting in a phase shift of the power signal to align with the harmonic energy in the system 100.

In some embodiments, the zig-zag configuration of the transformer circuit 306 and capacitor circuit 310 can include a number of transformer cores and capacitors to suppress one or more harmonic signals within the power signal. In particular, the zig-zag configuration can include three cores within the transformer configured to suppress a third harmonic signal or a multiple of the third harmonic signal that may oppose the power signal. Alternatively, the zig-zag configuration can include any number of cores to suppress one or more additional harmonic signals that may oppose the power signal.

In some embodiments, the transformer circuit 306 and capacitor circuit 310 can include primarily passive components. In particular, the transformer circuit 306 can include a transformer unconnected to a separate energy source from the power source 110. Additionally, the capacitor circuit 310 can include one or more capacitors unconnected from a separate energy source from the power source 110. For example, the power control system 110 can include exclusively passive components without requiring an additional power source to power one or more components within the power control circuit 302.

Figure 4:
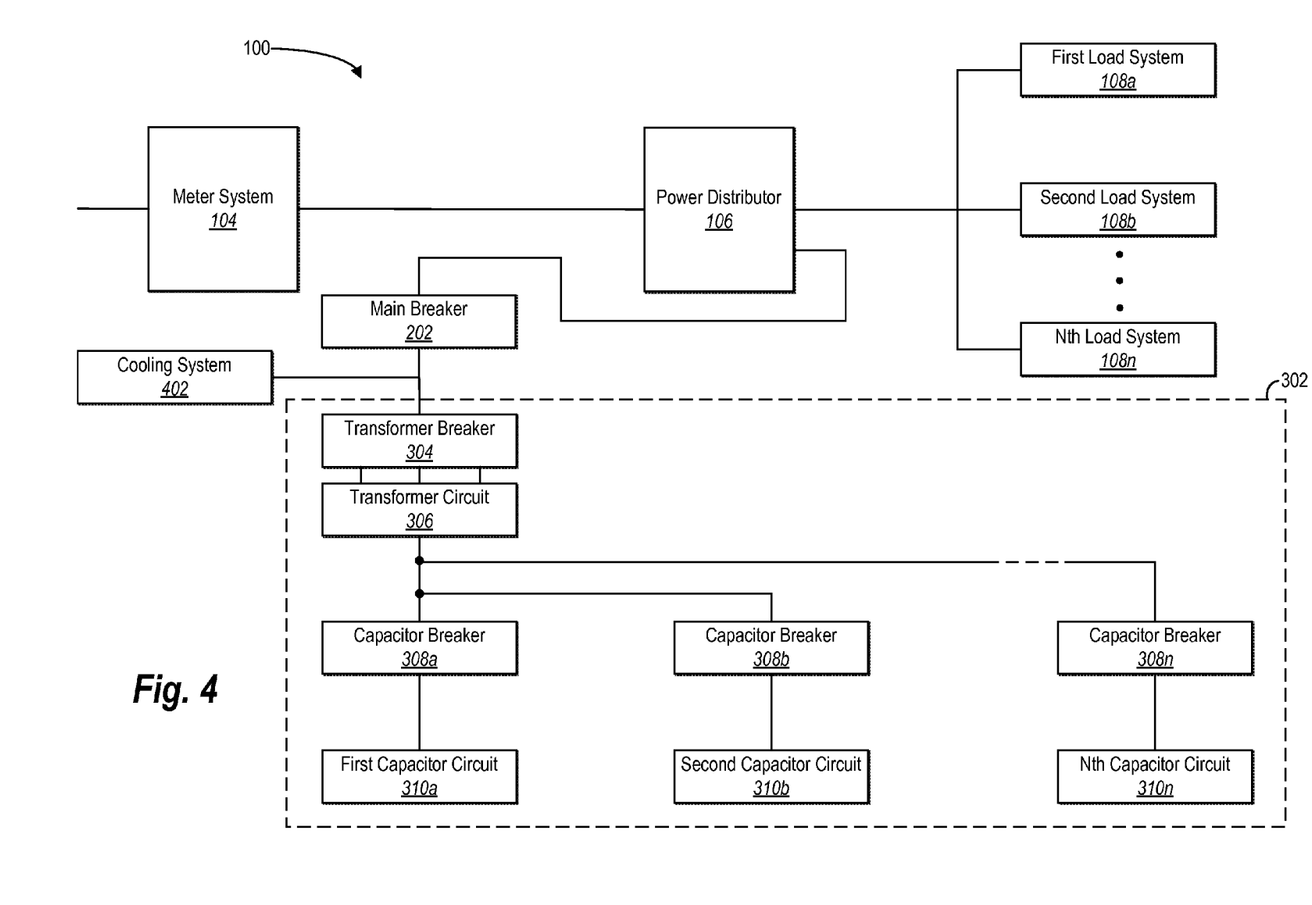
FIG. 4 illustrates a block diagram of an electrical power supply system in accordance with one or more embodiments described herein.

FIG. 4 illustrates an example of an electronic power supply system 100 (or simply "system") in accordance with one or more principles described herein. In particular, the system 100 of FIG. 4 may illustrate a more detailed embodiment of the systems 100 described above in connection with FIGS. 1-3.

For example, as illustrated in FIG. 4, the system 100 can include a meter system 104, power distributor 106, and load systems 108. Additionally, the system 100 can include a power correction system 110 coupled to a point of common coupling by way of a main breaker 302. While not shown in FIG. 4, the system 100 can further include a power source 102 providing electrical power to the load systems 108 by way of the meter system 104 and the power distributor 106. It is noted that the meter system 104, power distributor 106, load systems 108, and power correction system 110 can include similar features and functionality as similar components described above in connection with FIGS. 1-3.

Additionally, FIG. 4 illustrates one example of a more detailed embodiment of the power correction system 110 described above in connection with FIGS. 1-3. In particular, the power correction system 110 can include a power correction circuit 302 similar to the power correction circuit 302 described above in connection with FIG. 3.

As illustrated in FIG. 4, the power control circuit 302 can include a transformer breaker 304 and transformer circuit 306. The transformer breaker 304 and transformer circuit 306 can include similar features and functionality as the transformer breaker 304 and transformer circuit 306 described above in connection with FIG. 3. Additionally, the power control circuit 302 can include multiple capacitor breakers 308 coupled in series with multiple capacitor circuits 310. For example, as illustrated in FIG. 4, the power correction circuit 302 can include a first capacitor breaker 308a in series with a first capacitor circuit 310a, a second capacitor breaker 308b in series with a second capacitor circuit 310b up to an Nth capacitor breaker 308n in series with an Nth capacitor circuit 310n. The power correction circuit 302 can include any number of pairs of capacitor breakers 308 and capacitor circuits 310.

As illustrated in FIG. 4, the power control circuit 302 can include multiple capacitor circuits 310 coupled in parallel to each other and in series with the transformer circuit 306. In particular, the first capacitor circuit 310a can be parallel to the second capacitor circuit 310b and any number of additional capacitor circuits 310. Further, each of the capacitor circuits 310 can couple in series behind the transformer circuit 306 from the point of common coupling. In some embodiments, each capacitor circuit 310 can couple to a respective capacitor breaker 308. Alternatively, each of the multiple capacitor circuits 310 can couple to a single capacitor breaker 308 between the capacitor circuits 310 and the transformer circuit 306.

The power control circuit 302 can include a number of capacitor circuits 310 having parameters based on a desired capacitance or volt ampere reactance coupled to the transformer circuit 306. In particular, because a total capacitance and volt ampere reactance can be combined for multiple capacitor circuits 310 in parallel, the combination of the capacitor circuits 310 can have a predetermined capacitance and/or volt ampere reactance parameter.

In one embodiment, for example, the combination of the capacitor circuits 310 can have a volt ampere reactance of 40 kvar. In particular, the combined capacitance of all of the capacitor circuits 310 within the power correction circuit 302 can add up to 40 kvar. For example, in a power correction circuit 302 having two capacitor circuits 310, a first capacitor circuit 310a can have a volt ampere reactance of 30 kvar with a second capacitor circuit 310b having a volt ampere reactance of 10 kvar. Selecting a 30 kvar capacitor circuit 310 and a 10 kvar capacitor circuit 310 can provide a more economical combination of capacitors than designing and/or purchasing a less common 40 kvar capacitor, for example. Additional considerations can determine selection of parameters of capacitor circuits 310.

In addition to additional capacitor breakers 308 and capacitor circuits 310, the power correction system 110 can further include a cooling system 402 to cool one or more components of the power correction system 110. In particular, the cooling system 402 can couple to one or more transformer circuits 306 and one or more capacitor circuits 310 to cool the transformer circuits 306 and capacitor circuits 310. In one example embodiment, the cooling system 402 can include one or more fans that cool the power correction system 110. Alternatively, the cooling system 402 can cool the power correction system 110 using other cooling methods (e.g., liquid cooling, electrical cooling).

In some embodiments, the cooling system 402 can include multiple cooling mechanisms for cooling different components of the power control system 110. For example, the cooling system 402 can include a first cooling mechanism to cool one or more transformer circuits 306. Additionally, the cooling system 402 can include a second cooling mechanism to cool one or more capacitor circuits 310. Alternatively, the cooling system 402 can cool all of the components within the power control system 110 collectively using a single cooling mechanism (e.g., a fan).

Figure 5:
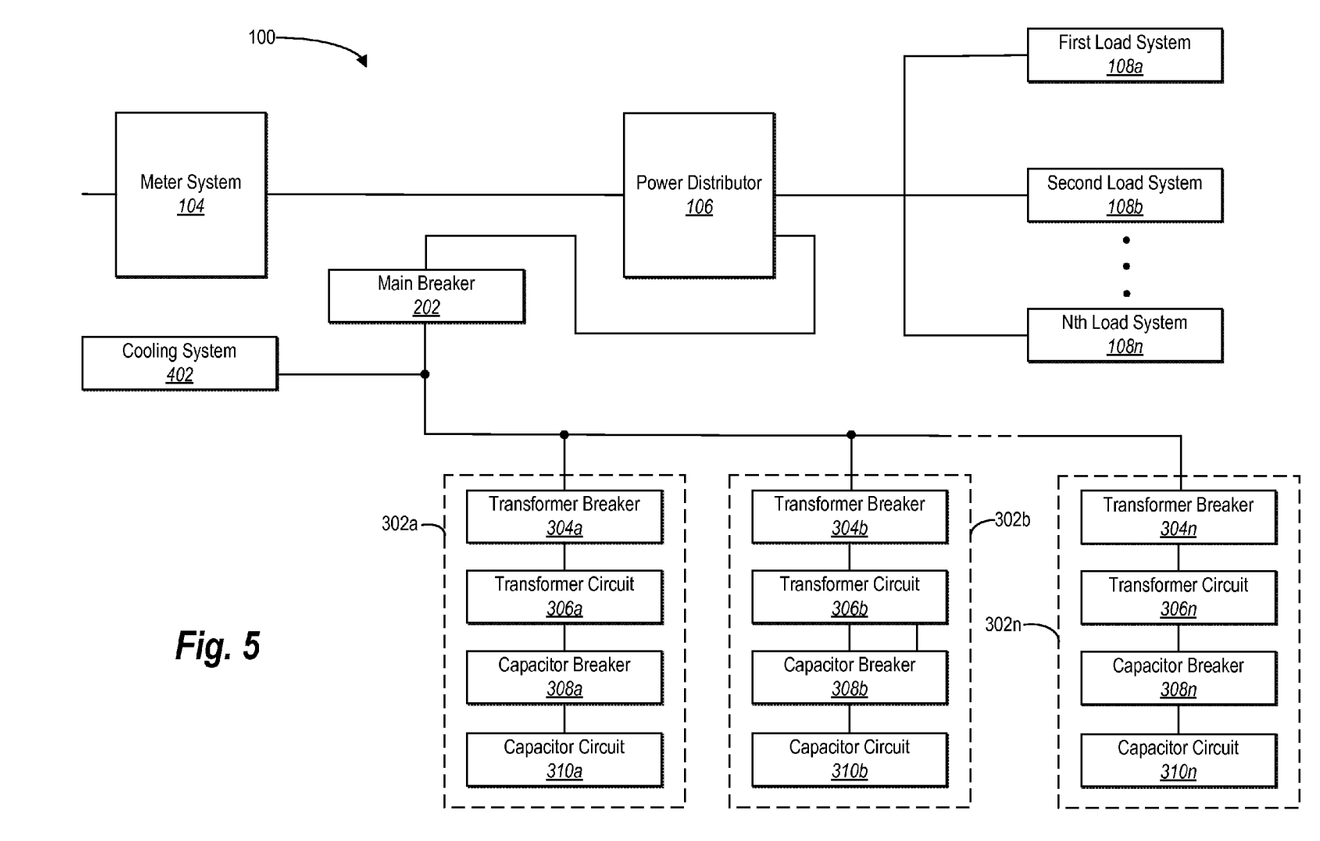
FIG. 5 illustrates a schematic diagram of an electrical power supply system in accordance with one or more embodiments described herein.

FIG. 5 illustrates an example of an electronic power system 100 (or simply "system") in accordance with one or more principles described herein. In particular, FIG. 5 may illustrate a more detailed embodiment of the systems 100 described above in connection with FIGS. 1-4.

For example, as illustrated in FIG. 5, the system 100 can include a meter system 104, power distributor 106, and load systems 108. Additionally, the system 100 can include a power correction system 110 coupled to a point of common coupling by way of a main breaker 302. While not shown in FIG. 5, the system 100 can further include a power source 102 providing electrical power to the load systems 108 by way of the meter system 104 and the power distributor 106. The system 100 can further include a cooling system 402 for cooling components of the power correction system 110. It is noted that the meter system 104, power distributor 106, load systems 108, power correction system 110, and cooling system 402 can include similar features and functionality as similar components described above in connection with FIGS. 1-4.

Additionally, FIG. 5 illustrates one embodiment of a power control system 110 including multiple power control circuits 302. For example, as illustrated in FIG. 5, the power control system 110 can include a first power control circuit 302a having a transformer breaker 304a, transformer circuit 306a, capacitor breaker 308a, and capacitor circuit 310a. The power control system 110 can also include a second power control circuit 302b having a transformer breaker 304b, transformer circuit 306b, capacitor breaker 308b, and capacitor circuit 310b. The power control system 110 can further include any number of power control circuits 302 up to, for example, an Nth power control circuit 302n having a transformer breaker 304n, transformer circuit 306n, capacitor circuit 308n, and capacitor circuit 310n.

Each of the power control circuits 302 can electrically couple to the point of common coupling. In particular, each power control circuit 302 can electrically couple between the meter system 104 and the load systems 108 at a point of common coupling. Further, each power control circuit 302 can couple in parallel to each additional power control circuit 302 at the point of common coupling. Additionally, as illustrated in FIG. 5, the power control circuits 302 can connect and/or disconnect from the point of common coupling via the main breaker 302.

In addition to the main breaker 202, each of the power control circuits 302 can individually connect and/or disconnect from the point of common coupling by way of a transformer breaker 304. In particular, each power control circuit 302 can connect and/or disconnect from the point of common coupling without connecting, disconnecting, or otherwise interrupting the operation of other power control circuits 302. For example, a first power control circuit 302a may be connected or disconnected by switching the transformer breaker 304a without interrupting a connection of the second power control circuit 302b to the point of common coupling. In some embodiments, every power control circuit 302 includes a respective transformer breaker 304. Alternatively, multiple power control circuits 302, and not necessarily all power control circuits 302 in a system 100 can connect and/or disconnect from the point of common coupling using a common transformer breaker.

Selective coupling and/or decoupling of the power control circuits 302 can facilitate convenient connection and/or disconnection of each power control circuit 302 from the system 100. In particular, selectively connecting or disconnecting power control circuits 302 can facilitate convenient installation, maintenance, and/or troubleshooting of the system 100. Additionally, adding and/or subtracting the number of power control circuits 302 to a system may facilitate more efficient mitigation of inrush current and/or alignment of the power signal with harmonic signals.

As mentioned above, power control circuit 302 can include similar features and functionality as other power control circuits 302 described above in connection with other FIGS. For example, while FIG. 4 illustrates each power control circuit 302 having a single capacitor breaker 308 and capacitor circuit 310, each power control circuit 302 can include multiple capacitor breakers 308 and capacitor circuits 310, as described above in connection with FIG. 4. Additionally, each power control circuit 302 can include transformers and capacitors having different parameters and configurations than other power control circuits 302 in the power control system 110. Alternatively, each of the power control circuits 302 can include transformers and capacitors having similar parameters and configurations as each additional power control circuit 302.

Figure 6:
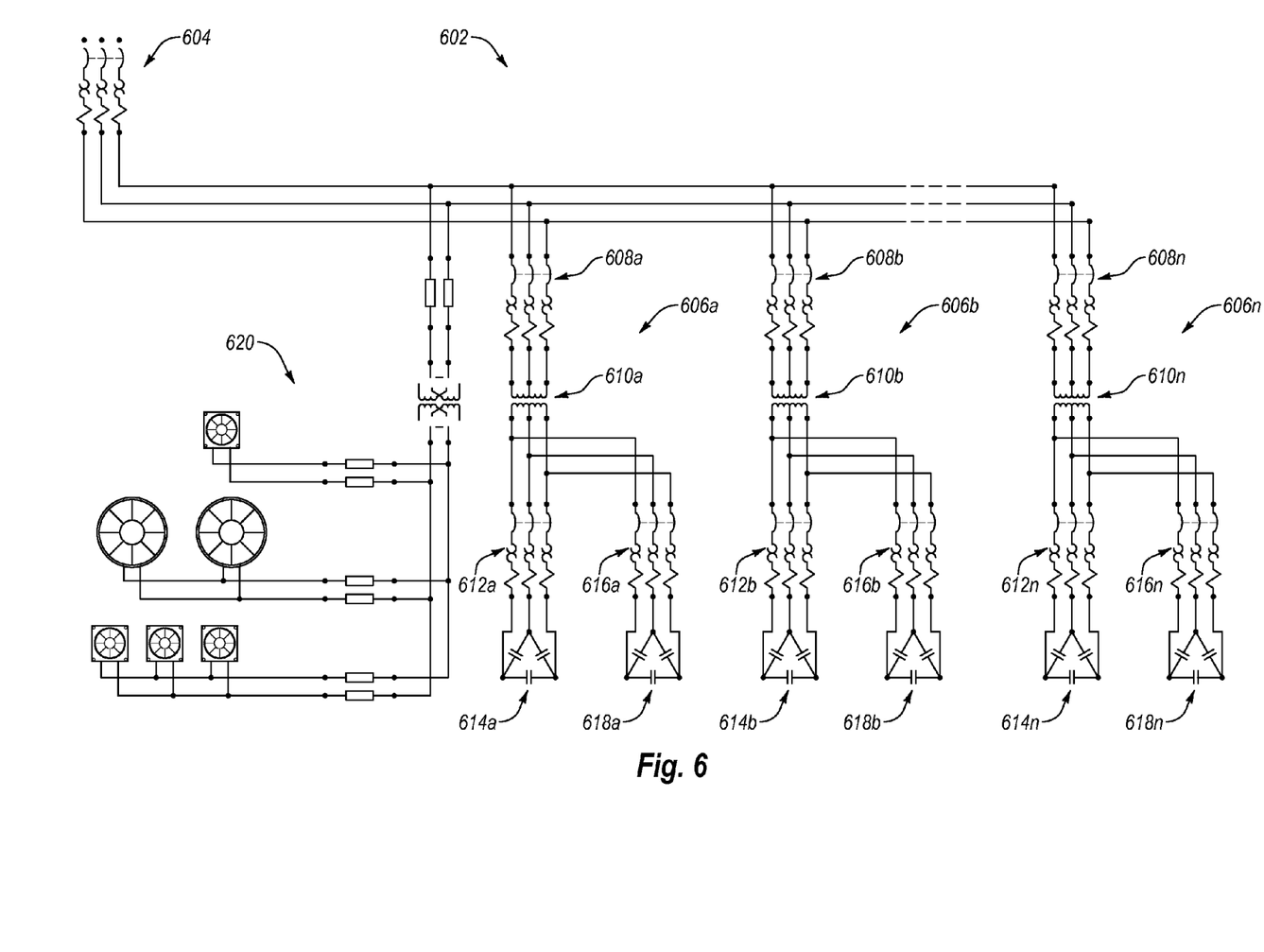
FIG. 6 illustrates a circuit diagram of a power correction circuit in accordance with one or more embodiments described herein.

FIG. 6 illustrates a circuit diagram of a power correction system 602 in accordance with one or more embodiments described herein. In particular, the power correction system 602 of FIG. 6 may illustrate a more detailed embodiment of the power correction system 110 described above in connection with FIGS. 1-5. Additionally, the power correction system 602 can include similar features and functionality as similar components described above in connection with other FIGS.

As illustrated in FIG. 6, the power control system 602 can include a main breaker 604 and power correction circuits 606. In particular, the power correction circuits can electrically couple to a point of common coupling by way of the main breaker 604. Additionally, the power control system 602 can include any number of power control circuits 606 coupled to the point of common coupling. For example, as illustrated in FIG. 6, the power control system 602 can include a first power control circuit 606a, second power control circuit 606b, up to an Nth power control circuit 606n.

As illustrated in FIG. 6, the first power control circuit 606a can include a transformer breaker 608a, a transformer circuit 610a, a first capacitor breaker 612a coupled to a first capacitor circuit 614a, and a second capacitor breaker 616a coupled to a second capacitor circuit 618a. Likewise, as illustrated in FIG. 6, the second power control circuit 606b can include a transformer breaker 608b, a transformer circuit 610b, a first capacitor breaker 612b coupled to a first capacitor circuit 614b, and a second capacitor breaker 616b coupled to a second capacitor circuit 618b. Further, as illustrated in FIG. 6, the Nth power control circuit 606n can include a transformer breaker 608n, a transformer circuit 610n, a first capacitor breaker 612n coupled to a first capacitor circuit 614n, and a second capacitor breaker 616n coupled to a second capacitor circuit 618n. Each power control circuit 608a-608n can include similar components having similar parameters as corresponding components in different power control circuits 608a-608n. Alternatively, each power control circuit 608a-608n can include components having different parameters as corresponding components in other power control circuits 608-608n.

Additionally, components within the power control system 602 can include various parameters. For example, the main breaker 604 can have a power rating of 480 volts and 800 amps. Further, each of the transformer breakers 608 can have a power rating of 480 volts and 100 amps. In some embodiments, the power rating of the transformer breakers 608 can vary based on the power rating of the main breaker 604 and a number of power correction circuits 606 in the power correction system 602. For example, in an example embodiment of the power correction system 602 having eight power correction circuits 606, a sum of the current rating of the transformer breakers 608 can equal a current rating of the main breaker 602. For instance, a main breaker 604 having a current rating of 800 amps can couple to eight transformer breakers 608, each having a current rating of 100 amps. Additionally, in some embodiments, the voltage rating of each transformer breaker 608*a* and capacitor breaker 612, 616 can equal the voltage rating of the main breaker 602.

The capacitor breakers 612, 616 can also have varying power ratings. For example, the first capacitor breakers 612 within each power control circuit 606 can have a power rating of 480 volts and 63 amps. Further, the second capacitor breakers 616 within each power control circuit can have a power rating of 480 volts and 20 amps. Alternative embodiments can include capacitor breakers 612, 616 having different ranges of power ratings.

The power ratings (e.g., current ratings, voltage ratings) can vary based on the applications of the system 100. For example, the power ratings of various components can vary based on a voltage and current of a power signal provided from a power source 102. Additionally, the power ratings of various components can vary based on specifications and power requirements of loads within the load systems 108. In some embodiments, the power ratings of various components may vary based on the atmosphere in which the system 100 is implemented. For example, a system 100 implemented at a residence may have different power requirements than a system 100 implemented at a business, utility company, or location having higher power density or power consumption.

Additionally, as illustrated in FIG. 6, the power control system 602 can include a cooling system 620. As illustrated in FIG. 6, cooling system 620 can include one or more fans coupled to the main breaker by way of a fuse and a transformer. In some embodiments, the power control system 602 can also include multiple fans. Each fan can provide cooling of different components within the power control system 602. For example, one or more fans can cool a disconnection section of the power control system 602. Additionally, a second group of fans can cool each of the transformer circuits 610. Further, a third group of fans can cool each of the capacitor circuits 614, 618. Each fan or group of fans can couple to the fuse and transformer by way of corresponding fuses in the cooling system 620.

Figure 7:
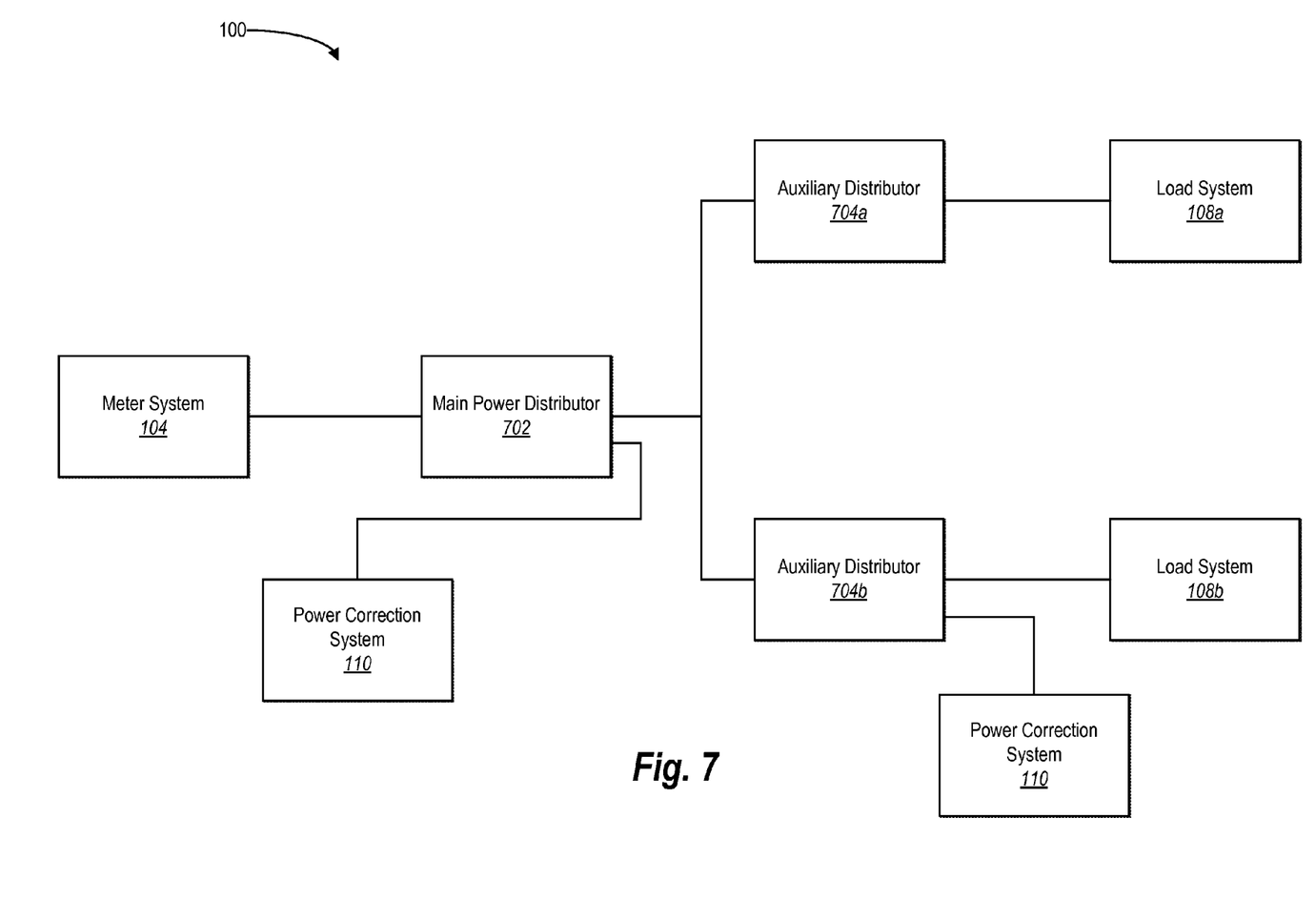
FIG. 7 illustrates a block diagram of an electrical power supply system in accordance with one or more embodiments described herein.

FIG. 7 illustrates a block diagram of an electrical power supply system 100 (or simply "system") in accordance with one or more principles described herein. In particular, FIG. 7 may illustrate an alternate embodiment of the systems 100 described above in connection with FIGS. 1-5.

For example, as illustrated in FIG. 7, the system 100 can include a meter system 104 coupled to load system 108 by way of a main power distributor 702 and one or more auxiliary power distributors 704. Additionally, the system 100 can include a power correction system 110 coupled to a point of common coupling. While not shown in FIG. 7, the system 100 can further include a power source 102 providing electrical power to the load systems 108 by way of the meter system 104, main power distributor 702 and auxiliary power distributors 704. It is noted that the meter system 104, load systems 108, and power correction system 110 coupled to the point of common coupling can include similar features and functionality as similar components described above in connection with FIGS. 1-6.

Additionally, FIG. 7 illustrates an embodiment of the system 100 including a main power distributor 702 coupled to load systems 108 by way of auxiliary power distributors 704. For example, as illustrated in FIG. 7, a power source 102 can provide electrical power to a first load system 108*a* by way of a main power distributor 702 and a first auxiliary power distributor 704*a*. Additionally, a power source 102 can provide electrical power to a second load system 108*b* by way of the main power distributor 702 and a second auxiliary power distributor 704*b*. Each of the main power distributor 702 and auxiliary power distributors 704*a*-704*b* can include similar features and functionality as the power distributor 106 described above in connection with FIGS. 1-5.

In some embodiments, a power correction system 110 can couple at a point of common coupling between an auxiliary power distributor 704 and a load system 108. For example, as illustrated in FIG. 7, a second power correction system 110 can electrically couple at a point of common coupling between the second auxiliary power distributor 704*b* and the second load system 108*b*. In some embodiments, the second power correction system 110 can couple to a point of common coupling between the first auxiliary power distributor 704*a* and the first load system 108*a*. Alternatively, the system 100 can include any number of power correction systems 110 coupled at a point of common coupling between any one of the auxiliary power distributors 704 and corresponding load systems 108.

Coupling a second power control system 110 to a point of common coupling can facilitate efficient power consumption in a load system 108. In particular, some systems 100 can have one or more load systems 108 that generate higher levels of harmonic signals or inrush current that would benefit from an additional power control system 110 coupled between the meter system 104 and the load system 108. Accordingly, FIG. 7 illustrates an embodiment of the system 100 in which a second power correction system 110 can provide further power correction to a second load system 108*b* without interrupting the operation of a first load system 108*a*. Alternatively, in some embodiments, the system 100 can include a power correction system 110 coupled at a point of common coupling between an auxiliary power distributor 704 and a load system 108 without also including the power correction system 100 coupled at a point of common coupling between the output of the meter system 104 and the main power distributor 702.

The embodiments can be embodied in other specific forms without departing from its spirit or essential characteristics. The described embodiments are to be considered in all respects only as illustrative and not restrictive. For example, the methods described herein can be performed with less or more steps/acts or the steps/acts can be performed in differing orders. Additionally, the steps/acts described herein may be repeated or performed in parallel with one another or in parallel with different instances of the same or similar steps/acts. The scope of the embodiments is, therefore, indicated by the appended claims rather than by the foregoing description. All changes that come within the meaning and range of equivalency of the claims are to be embraced within their scope.

What is claimed is:

1. An electrical power supply system, comprising:
   a main breaker electrically coupled to a power source at a point of common coupling, wherein the power source provides electrical power having a first set of characteristics prior to the point of common coupling;

a power correction system electrically coupled to the main breaker, the power correction system comprising a power correction circuit, the power correction circuit comprising:
- a transformer circuit comprising a transformer; and
- a capacitor circuit comprising one or more capacitors, the capacitor circuit coupled in series behind the transformer circuit from the point of common coupling; and wherein the electrical power has a second set of characteristics after the point of common coupling.

2. The power correction system of claim 1, wherein the transformer circuit comprises a zigzag transformer.

3. The power correction system of claim 1, wherein the power correction system is coupled to the point of common coupling in a parallel configuration.

4. The power correction system of claim 3, wherein the power correction system is configured to be disconnected by the main breaker without disrupting delivery of power to one or more loads powered by the power source.

5. The power correction system of claim 1, further comprising a second power correction circuit comprising a second transformer circuit and a second capacitor circuit.

6. The power correction system of claim 5, further comprising one or more additional power correction circuits.

7. The power correction system of claim 5, wherein either of the power correction circuit or the second power correction circuit are configured to be disconnected from the point of common coupling without interrupting operation of the other power correction circuit.

8. The power correction system of claim 1, wherein the power correction circuit consists of passive circuit components.

9. The power correction system of claim 1, wherein the transformer circuit is configured to shift a phase of a power signal by fifteen to thirty degrees.

10. The power correction system of claim 1, wherein the transformer has an inductance of approximately 500 microhenries.

11. The power correction system of claim 1, wherein the one or more capacitors have a capacitance of approximately 125 microfarads.

12. The power correction system of claim 1, wherein the one or more capacitors have a volt ampere reactance of approximately 40 kvar.

13. The power correction system of claim 1, wherein the power correction circuit comprises a second capacitor circuit in parallel to the capacitor circuit, the second capacitor circuit comprising a second capacitor breaker and one or more capacitors coupled in series behind the transformer circuit from the point of common coupling.

14. The power correction system of claim 1, wherein the power correction system further comprises a cooling system coupled between the main breaker and the power correction circuit.

15. A power correction system, comprising:
- a main breaker coupled to a point of common coupling of a power source; and
- a power correction circuit coupled in parallel between a power meter and a power distribution panel, wherein the power correction system comprises a transformer and one or more capacitors coupled in series behind the transformer from the point of common coupling, wherein the transformer and the one or more capacitors are configured to align harmonic power signals deriving from one or more electronic loads with a power signal from the power source.

16. The power correction system of claim 15, wherein the transformer and one or more capacitors are configured to align the third, fifth, and seventh harmonic power signals deriving from one or more electronic loads with the power signal from the power source.

17. The power correction system of claim 15, wherein the power correction system comprises one or more additional power correction circuits coupled in parallel to the power correction circuit, each additional power correction circuit comprising an additional transformer and additional one or more capacitors configured to align harmonic power signals deriving from one or more electronic loads with a power signal from the power source.

18. The power correction system of claim 15, wherein the transformer and one or more capacitors are configured to align harmonic power signals deriving from one or more non-linear electronic loads.

19. The power correction system of claim 15, wherein the transformer and one or more capacitors are further configured to increase a power factor measured by the power meter.

20. The power correction system of claim 15, wherein the transformer and one or more capacitors are further configured to reduce the level of in-rush current from the one or more electronic loads.

* * * * *